United States Patent [19]
Perkins et al.

[11] Patent Number: 5,398,154
[45] Date of Patent: Mar. 14, 1995

[54] CARD GROUNDING APPARATUS

[75] Inventors: Carl C. Perkins, Irvine; Duncan D. MacGregor, Shingle Springs, both of Calif.

[73] Assignees: ITT Corporation, Secaucus, N.J.; Intel Corporation, Santa Clara, Calif.

[21] Appl. No.: 918,774

[22] Filed: Jul. 27, 1992

Related U.S. Application Data
[63] Continuation of Ser. No. 757,767, Sep. 11, 1991.

[51] Int. Cl.6 .................... H01R 13/453; H01K 1/14
[52] U.S. Cl. ...................................... 361/212; 439/60; 439/59
[58] Field of Search ............... 361/212, 220, 225–230; 439/629–637, 59, 60; 436/59–60

[56] References Cited
U.S. PATENT DOCUMENTS

| | | | |
|---|---|---|---|
| 3,200,361 | 8/1965 | Schwartz et al. | 339/17 |
| 4,138,711 | 2/1979 | Bremenour et al. | 361/424 |
| 4,146,291 | 3/1979 | Goff et al. | 339/111 |
| 4,384,368 | 5/1983 | Rosenfeldt et al. | 455/602 |
| 4,388,671 | 6/1983 | Hall et al. | 361/383 |
| 4,399,487 | 8/1983 | Neumann | 361/391 |
| 4,491,981 | 1/1985 | Weller et al. | 455/602 |
| 4,531,176 | 7/1985 | Beecher, II | 361/424 |
| 4,780,570 | 10/1988 | Chuck | 174/35 |
| 4,821,146 | 4/1989 | Behrens et al. | 361/383 |
| 4,849,944 | 7/1989 | Matsushita | 371/21 |
| 4,872,091 | 10/1989 | Maniwa et al. | 361/424 |
| 4,889,495 | 12/1989 | Kimura | 439/60 |
| 4,955,817 | 9/1990 | Sugai | 439/60 |
| 4,980,856 | 12/1990 | Ueno | 364/900 |
| 5,031,076 | 7/1991 | Kiku | 361/424 |
| 5,050,041 | 9/1991 | Shafi | 361/391 |
| 5,169,345 | 12/1992 | Pernet | 439/60 |

*Primary Examiner*—A. D. Pellinen
*Assistant Examiner*—Aditya Krishnan
*Attorney, Agent, or Firm*—Thomas L. Peterson

[57] ABSTRACT

A system is provided wherein an IC memory card (10) is inserted into a slot (12) of an electronic device (14), which discharges any static electric charge on the card prior to mating of card and device contacts (32, 34). The card has a frame with opposite sides that have metal clips, and the electronic device has grounding terminals (74, 76) that engage the clips, as the card is inserted.

13 Claims, 4 Drawing Sheets

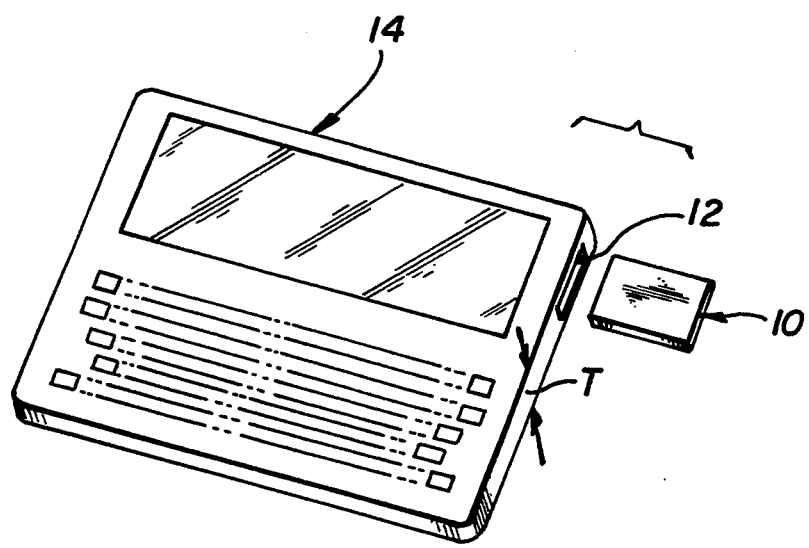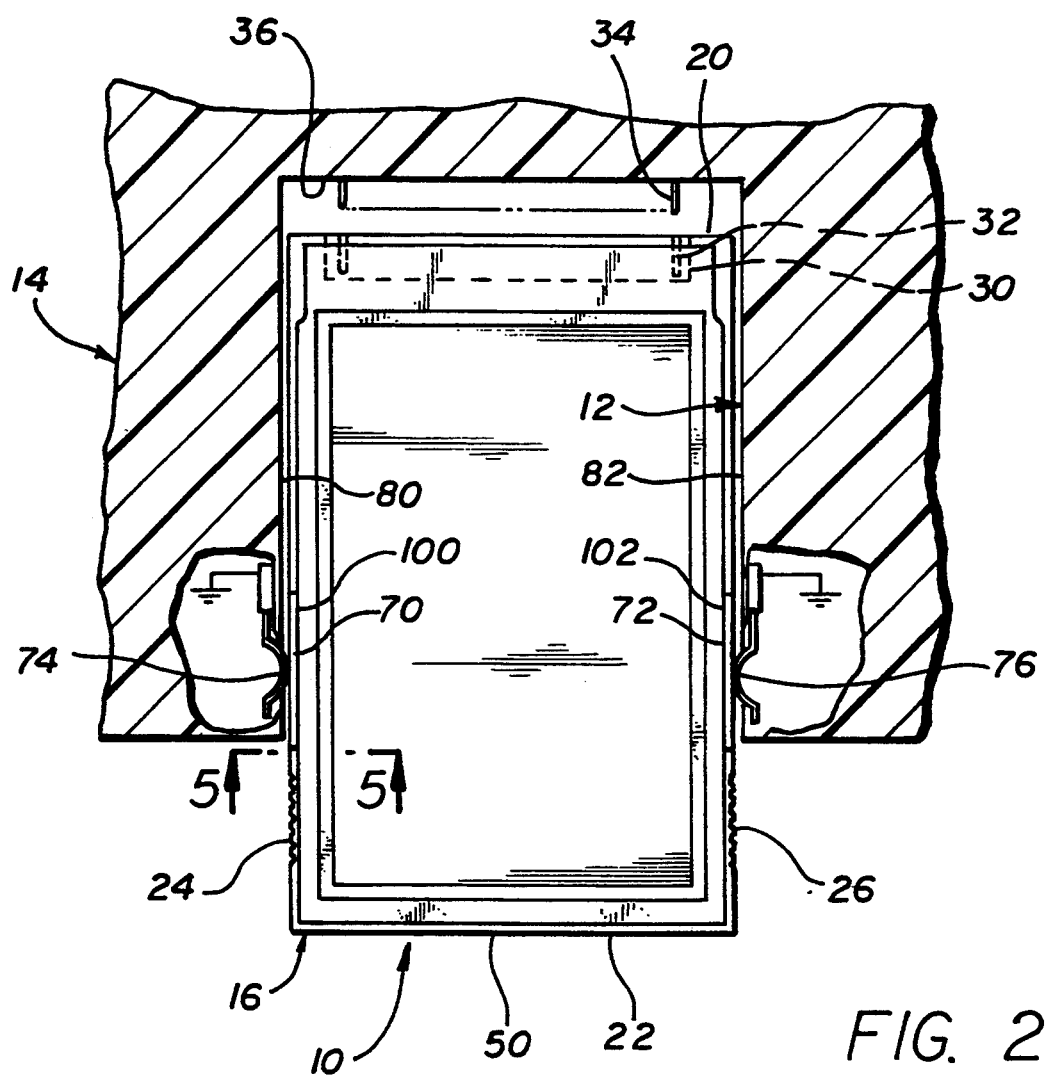

CARD GROUNDING APPARATUS

This is a continuation of application Ser. No. 07/757,767, filed Sep. 11, 1991.

BACKGROUND OF THE INVENTION

IC cards such as memory cards, are commonly are constructed with a molded plastic body having opposite sides and ends, a combination circuit board and connector that is installed in the body, and top and bottom metallic covers installed at the top and bottom of the body. Such memory cards are especially useful in electronic equipment or devices of very small thickness, such as laptop computers that may have a width and length of 8½ inches by 11 inches, and a thickness of much less than one inch. Standard JEIDA cards have a thickness of five millimeters, which enables them to be inserted into thin slots of tile electronic device.

The cards often hold a considerable static electric charge, which should be dissipated prior to mating of signal contacts of the card and device. Memory cards are currently provided with grounding contacts at the front of the card that project slightly forward of the rest of the contacts so the card is grounded before the signal contacts are mated. However, a static electric voltage of a few thousand volts can jump a large fraction of an inch, so there is danger that a static discharge can occur between signal contacts, which can harm the system. A static discharge system which provided early discharge of static electricity on a memory card, would be of considerable value.

SUMMARY OF THE INVENTION

In accordance with one embodiment of the present invention, an IC card such as a memory card is provided which enables early grounding of tile card during its insertion into a slot of an electronic device. The card has a frame that includes a molded body which holds a circuit board assembly having a ground plane and which holds a connector connected to the circuit board. The frame has a highly conductive region such as a metal clip with a terminated portion connected to the ground plane of the circuit board and with a portion lying on the outside surface of the card. This enables the electronic device to connect to the card by a grounding terminal of the electronic device that lies rearward of the contacts of the device. The highly conductive region preferably lies at at least one of the sides of the frame, and the contactor extends into one side of the slot to engage a side of the frame, the sidewardly extending contactor facilitating construction of a thin electronic device.

The body of the card frame can be molded of electrically conductive material, with the metal conductive region lying a distance rearward of the front of the card side. As a result, the grounding terminal first engages the moderately high resistance electrically conductive material of the body, for partial static discharge, and later engages the metal part of the conductive region for complete discharge. The card preferably has highly conductive regions at opposite sides of the card, and the electronic device preferably has a grounding terminal at opposite sides of the slot and positioned so both terminals simultaneously engage the highly conductive regions at opposite sides of the card.

The novel features of the invention are set forth with particularity in the appended claims. The invention will be best understood from the following description when read in conjunction with the accompanying drawings.

BRIEF DESCRIPTION OF THE DRAWINGS

FIG. 1 is an isometric view of an IC memory card and an electronic device in the form of a laptop computer, constructed in accordance with the present invention.

FIG. 2 is a sectional top view of the memory card and a portion of the electronic device of FIG. 1.

DESCRIPTION OF THE PREFERRED EMBODIMENTS

Figure 3:
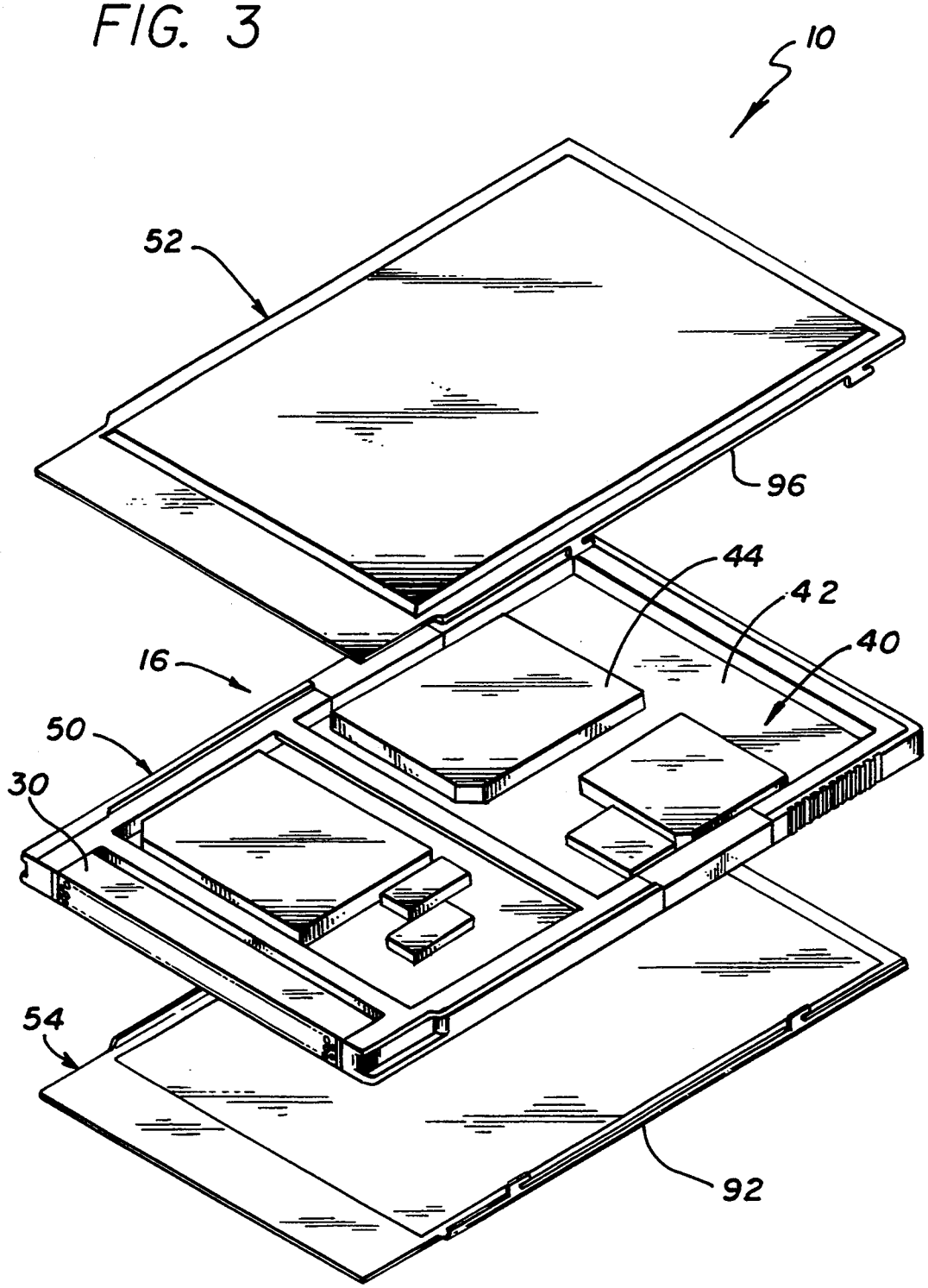
FIG. 3 is an exploded isometric view of the memory card of FIG. 2.

FIG. 1 illustrates an IC (integrated circuit) memory card 10 of the present invention that is adapted to be inserted into a slot 12 of an electronic device 14, the particular device shown being a laptop computer. One style of electronic computer has a width and length of 8.5 inches and 11 inches respectively and a thickness T that is as small as possible, preferably a small fraction of an inch. Such a laptop computer can be carried around in space designed to be occupied by ordinary sheets of paper or booklets. One source of concern in using memory cards, is that the card may have a considerable static electric charge, which must be dissipated prior to full insertion of the card, to avoid damage to components in the electronic device.

FIG. 2 shows the memory card 10 as it is being inserted into the slot 12 of the device 14. The memory card includes a frame 16 with forward and rearward ends 20, 22 and opposite sides 24, 26. A connector 30 is mounted at the forward end of the frame and has multiple socket contacts 32. The electronic device has multiple corresponding pin contacts 34 at the front end 36 of the slot, which fully engage the socket contacts when the card is fully inserted into the slot.

Figure 6:
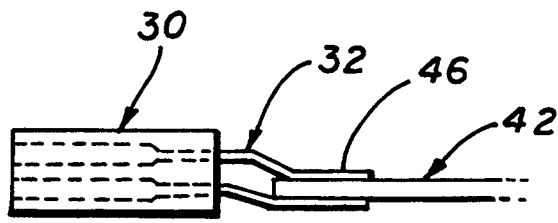
FIG. 6 is a side view of a combination of connector and circuit board assembly of the card of FIG. 3.

FIG. 3 shows details of the memory card 10, which includes the frame 16 and connector 30 that is mounted at the forward end of the frame. A circuit board assembly 40 that is mounted on the frame, includes a circuit board 42 and a plurality of circuit components 44 mounted on the board. FIG. 6 illustrates how the rear ends 46 of the connector socket contacts 32 are connected to conductive traces on the board 42. The frame 16 (FIG. 3) includes an injection molded body 50 and upper and lower electrically conductive covers 52, 54 that can be mounted on the top and bottom of the frame body 50. The card is assembled by first installing the combination circuit board assembly 40 and connector 30 on the body 50. Then the upper and lower covers 52, 54 are attached to opposite faces of the body. It is possible to mold the connector 30 as part of the frame, although the connector is usually manufactured separately.

Figure 4:
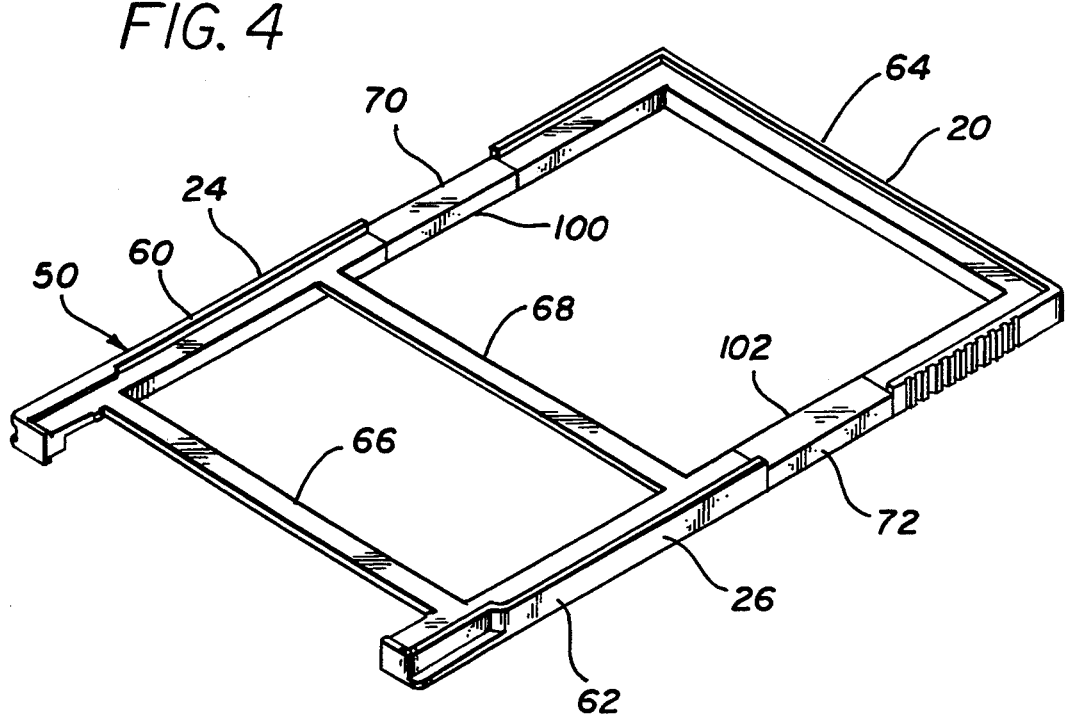
FIG. 4 is an isometric view of just the body of the frame of the memory card of FIG. 3.

FIG. 4 illustrate details of the molded body 50. The body includes a pair of side beams 60, 62 forming the opposite sides or side edges 24, 26 of the card, and a rear beam 64 forming the rear end 22 of the card. The body also includes a pair of cross beams 66, 68 which strengthen the body.

in accordance with the present invention, the frame includes a pair of highly conductive regions 70, 72 at opposite side edges 24, 26 of the card. The highly conductive regions are formed by a pair of clips or layers 100, 102 formed of material such as gold plated copper. The clips are preferably formed of material having a bulk resistivity that is no more than about one order of magnitude greater than that of copper (whose bulk electrical resistivity is 1.7 microhm-centimeter). The highly conductive regions 70, 72 can be contacted by grounding terminals of the electronic device to completely discharge any static electric charge on the card prior to mating of signal contacts at the front of the card with corresponding contacts of the electronic device.

As shown in FIG. 2, applicant constructs the electronic device with a pair of grounding contactors or terminals 74, 76 at opposite sides of the slot that are connected to a ground plane of the electronic device. As the card is inserted into the slot, the grounding terminals 74, 76 wipe against the highly conductive regions 70, 72 at opposite side edges 24, 26 of the card to establish contact therewith. The conductive regions of the card are connected to the ground potential of circuitry on the circuit board. As a result, when the grounding terminals engage the conductive regions of the card, the terminals discharge any electrical charge on the card, prior to mating of the contacts 32, 34 on the card and electronic device. It is not unusual for a static electric charge on a card to have a potential of a few thousand volts, and such a voltage can create a spark that jumps a gap of one-quarter inch. Accordingly, it is desirable that a terminal engage a conductive card region before the card and device contacts are as close as one-quarter inch.

Figure 5:
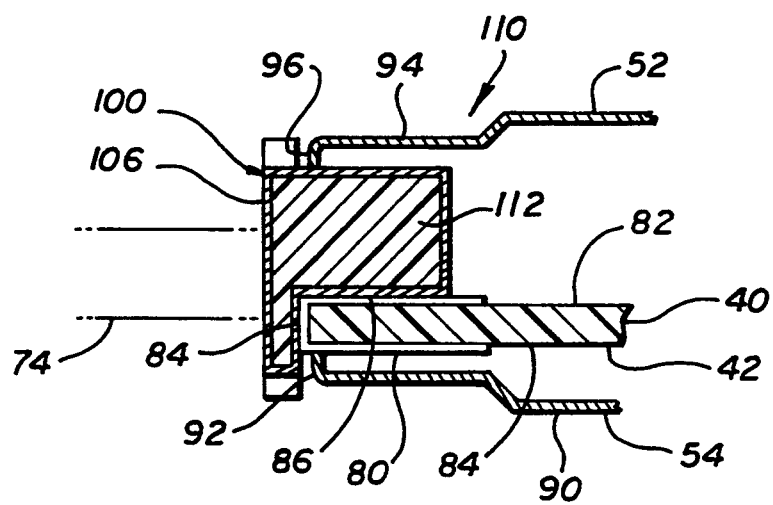
FIG. 5 is a partial sectional view of a memory card taken on the line 5—5 of FIG. 2.

FIG. 5 illustrates some details of the connection of the circuit board assembly 40 and an electrically conductive region 70 of the frame. The circuit board 42 of the assembly includes a ground plane 80 of electrically conductive material such as metal foil, which is connected to grounded locations of the electronic components on the board. The ground plane lies on the opposite faces 82, 84 of the board adjacent to the edges 84 of the board. A clip or layer 100 extends around the entire side 106 of the body, around the molded material 112 thereof. When the card is assembled as shown in FIG. 5, the ground plane 80 lies facewise against a surface 86 of the clip, to ground the clip. As a result, when a grounding terminal 74 contacts the clip, the ground plane of the circuit board is quickly established at the same potential as ground in the electronic device. The bottom cover 54 has a horizontally-extending face 90 and has an edge portion 92 that is bent to extend largely vertically. The edge of the edge portion bears against the ground plane at 80, to assure that the lower cover 54 is maintained at the same potential as the ground plane of the circuit board and the conductive regions. The top cover 52 also has a face 94 and a bent edge portion 96 whose edge contacts the conductive clip to keep the upper cover grounded.

The construction of the electronic device with the grounding terminals 74, 76 that engage conductive regions at opposite sides of the card, instead of at its opposite faces, enables the electronic device to be made thinner. That is, each ground terminal such as 74 requires appreciable space beyond the card surface that it engages, and by using space along the width or length of the card instead of along its thickness, applicant is able to construct the electronic device so that it is very thin.

It is possible to use a single ground terminal such as 74 instead of two of them, to simplify the electronic device and reduce its cost. However, tests that applicant has conducted show that symmetrical grounding is highly desirable, in that unsymmetrical discharge of the static charge on the card can result in damage to the circuitry in the card. Thus, applicant prefers to arrange the two grounding terminals 74, 76 so that each engages an opposite clip 100, 102 at the same time to symmetrically discharge static electricity from the card.

The molded body 50 (FIG. 5) can be formed of dielectric material (a resistivity more than $10^5$ times that of copper), so static discharge occurs only when the ground terminals engage the clips. However, applicant may prefer to construct the molded body material 112 of electrically conductive material, although with a bulk conductivity less than one-half and preferably less than one-tenth that of the material of the clip 100. Such conductive body is connected to the ground potential of the clip and of the circuit board. In such an arrangement, the ground terminals 74, 76 (FIG. 2) initially engage a grounded moderate resistivity material as they engage the opposite sides 24, 26 of the card. These highly conductive regions 70, 72 are exposed, in that they are not covered, so that terminals 74,76 of the electronic device can directly engage these conductive regions. The advantage is that static discharge is more gradual in that it occurs over a longer period of time, resulting in smaller discharge current and less possibility of damage to the card and electronic device. The presence of the high conductivity clips 100, 102 assures that all of the static charge is discharged prior to mating of the contacts at the front end of the card in the event that there is a large static charge on the card. The provision of an all conductive body has the additional advantage of guarding against EMI (electromagnetic interference).

Figure 7:
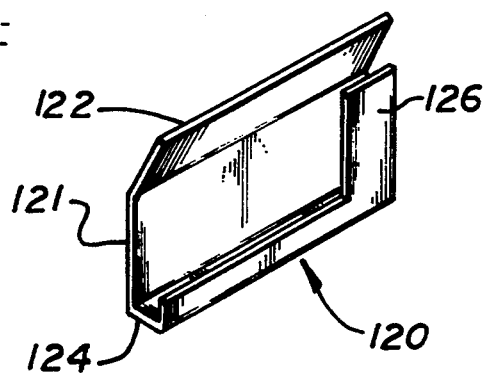
FIG. 7 is an isometric view of a conductive clip constructed in accordance with another embodiment of the invention.
Figure 8:
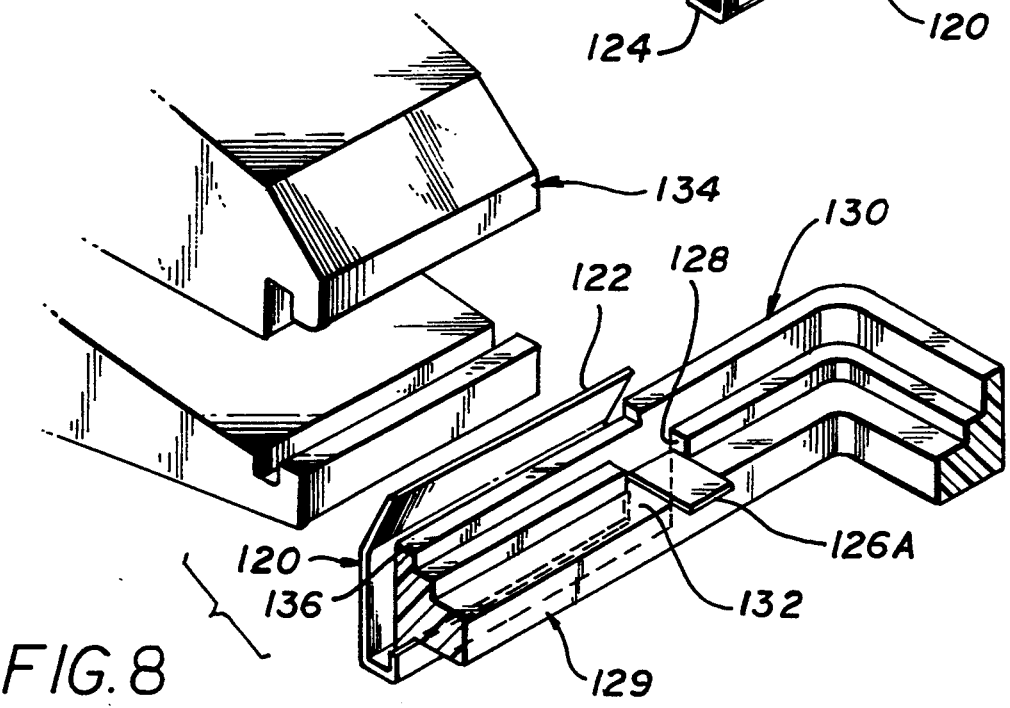
FIG. 8 is a partial sectional view of the clip of FIG. 7 and of a memory card on which it is mounted, showing the clip during the process of mounting and showing a portion of a mounting tool therefor.
Figure 9:
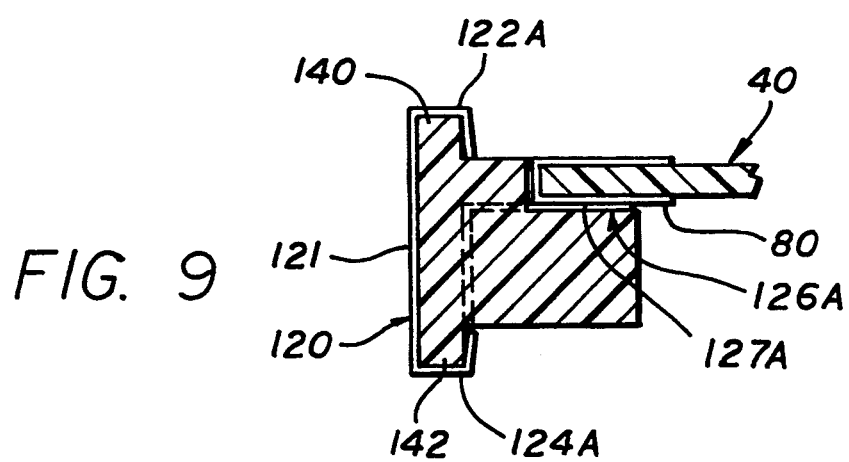
FIG. 9 is a partial sectional view of the clip and card of FIG. 8, with the clip fully installed.

FIGS. 7-9 illustrate another clip 120 which formed of thin sheet metal that is initially bent in the shape shown in FIG. 7. The clip includes an outer side 121 that will lie at the outer surface of the memory card body, upper and lower parts 122,124 that will lie around the upper and lower surfaces of the body, and a contact tab 126. The clip is initially installed as shown in FIG. 8 on the body 130 of the memory card frame, with the contact tab at 126A that will be bent to extend inwardly (i.e. toward the opposite side of the body) extending through a slot 128 in the body side beam 129, and bent down along a board-support surface 132 of the body. Then, a tool 134 is used to bend the upper part 122 tightly around a body lip 136 to securely hold the clip in place. FIG. 9 shows the circuit board assembly 40 installed, with the ground plane 80 thereof lying facewise against the bent part 127A of the tab 126A of the clip to electrically connect them. The upper and lower clip parts at 122A, 124A lie about upper and lower projections 140, 142 of the body side beam 129. It may be noted that the card in FIGS. 8 and 9 are in an orientation upside-down from that of FIG. 5.

Thus, the invention provides a memory card that can be inserted into the slot of an electronic device, which assures discharge of any static charge on the card prior to mating of the contacts of the card and device. The card has an electrically conductive region of metal or other highly conductive material mounted on the molded body of the card frame and connected to a ground plane of the card circuit board, and the electronic device has at least one grounding terminal positioned to engage the conductive region. The conductive region preferably lies at a side edge of the card to minimize the required height of the electronic device. Preferably, opposite sides of the card have conductive clips or the like and the device has a pair of grounding terminals for engaging them. The body of the frame can be formed primarily of electrically conductive material of higher resistance than the clips, to gradually discharge the static charge, with the clips quickly discharging any remaining charge.

Although particular embodiments of the invention have been described and illustrated herein, it is recognized that modifications and variations may readily occur to those skilled in the art, and consequently, it is intended that the claims be interpreted to cover such modifications and equivalents.

We claim:

1. An IC card which includes a frame comprising a molded body of plastic material having opposite sides and forward and rearward ends, and a top and bottom, with the distance between said opposite sides being a plurality of times greater than the distance between said top and bottom, and a circuit board assembly which lies in said frame and which includes a board having a ground plane and a plurality of circuit components mounted in said board, said card being constructed to be inserted into a slot of an electronic device until card contacts that lie at the front end of the card mate with device contacts in the device, characterized by:
said frame includes a sheet metal clip of material which has a higher bulk conductivity than said plastic material of said body, said clip having a first portion connected to said ground plane and having a second portion extending from said first portion and fixed to a first of said body sides and exposed at said first of said body sides, whereby to enable early static discharge of said ground plane.

2. The IC card described in claim 1 including:
an electronic device having a card-receiving slot with opposite sides, with a rear end for initially receiving said card, and with a front end, said device having a plurality of contacts at said front end, said device having a first grounding terminal positioned to engage said conductive clip and discharge any static charge on said card before any of said card contacts come within one-quarter inch of said device contacts, said slot being deed enough, as measured between said front and rear ends of said slot, to receive more than half of the length of said card, and said first grounding terminal lies closer to said rear end than to said front end to thereby assure early discharge of any static change.

3. The improvement described in claim 1 wherein:
said body is constructed of molded plastic material which is electrically conductive, with an electrical resistivity less than $10^5$ times that of copper, but has an electrical resistivity that is more than twice the electrical resistivity of the material of said clip, and said clip is spaced from the front end of said body.

4. The IC card described in claim 1 wherein:
said body has a pair of side beams that each forms one of said sides;
said clip extends at least partially around a first of said side beams;
said circuit board has opposite faces and edges, with a first of said circuit board edges lying adjacent to a first of said body side beams, and said ground plane of said circuit board includes a portion lying on one of said board faces and against a portion of said clip which lies against said body side beam.

5. The IC card described in claim 1 wherein:
said body has a pair of side beams, with a first of said side beams having upper and lower projections and having a slot;
said sheet metal clip has upper and lower parts bent about said upper and lower projections, and said clip has a tab that forms said clip first portion and that extends through said slot and that has a bent part that lies against said ground plane of said circuit board.

6. An IC card comprising:
a frame comprising a body having opposite sides and front and rear ends and having top and bottom covers that each have a peripheral portion, with distance between said opposite sides being a plurality of times greater than the distance between said top and bottom covers;
a circuit board assembly mounted in said body, said circuit board assembly including a board and at least one circuit component mounted on said board, said board having a ground plane;
a connector on said front end of said body, said connector having a plurality of contacts;
at least one sheet metal clip mounted in a stationary position on said body and connected to said ground plane, said clip having a first clip portion lying at and exposed at one of said sides of said frame, and having a second clip portion, which is engaged with one of cover peripheral portions.

7. The card described in claim 6 wherein:
said body includes portions extending along at least said opposite sides and constructed of molded electrically conductive material, with said clip formed of material of higher conductivity than material of said body, said body being electrically connected to said board ground plane, said body including a portion lying at said one of said frame sides and having a portion extending forward of said clip.

8. A combination of an electronic device having walls forming a card-receiving slot, and an IC card which can be inserted and withdrawn from said slot with said card including a circuit board assembly with a ground plane, wherein said slot has a rear end into which said card is initially inserted and a front end and said device has a plurality of device contacts arranged in a plurality of rows lying at said slot front end, and said card has a front end with a connector having a plurality of forwardly extending card contacts that are arranged in a corresponding number of rows and that mate with said device contacts when said card is in a fully inserted position, the improvement wherein:
said card has a frame with a stationary electrically conductive region spaced from said rows of contacts and connected to said ground plane, and said device has at least a first grounding terminal lying substantially at the walls of said slot and positioned to engage said conductive region and discharge any static charge on said card while said card lies at least one-quarter inch rearward of a position at which any of said card and device contacts mate.

9. The combination described in claim 8 wherein:

said card frame has opposite side beams and has a sheet metal clip that extends around a first of said side beams to hold to said first side beam, said clip having a portion exposed at an outside surface of said first beam, and said clip having an inwardly extending portion that engages said ground plane of said circuit board assembly.

10. The combination of components which when assembled forms the housing of an IC card that is adapted to support a circuit board that has opposite sides and a ground plane, said combination comprising:

a molded plastic body that has opposite body sides and a top and bottom, said body having opposite body side edges facing substantially away from each other, said opposite body sides being constructed to support the opposite sides of a circuit board, the distance between said opposite sides being a plurality of times greater than the distance between said top and bottom;

a sheet metal clip which is mounted in a stationary position on a first of said body sides, said clip having an outer side portion covering part of the side edge of said body first side, and said clip having a second portion which extends inwardly from said outer portion to direct electrically connect to the ground plane of a circuit board which is supported on said body sides.

11. The combination described in claim 10 wherein:

said body has first and second opposite side beams that form said body sides and said side edges;

said clip substantially surrounds said first beam in close contact therewith to hold itself in place thereon.

12. The combination described in claim 10 wherein:

said body side has a slot and said sheet metal clip has an inwardly projecting contact tab that projects through said slot to contact the ground plane of a circuit board which is supported on said body sides.

13. The combination described in claim 12 including:

a circuit board assembly that includes a circuit board, said circuit board having opposite board side portions, with said ground plane including a ground plane portion lying at a first of said board side portions and in direct contact with said clip second portion.

* * * * *